(12) United States Patent
Schrenk et al.

(10) Patent No.: US 9,403,923 B2
(45) Date of Patent: Aug. 2, 2016

(54) PROCESS FOR PREPARING SYNTHETIC POLYETHYLENE WAXES HAVING A HIGH CRYSTALLINITY AND LOW VISCOSITY

(75) Inventors: Volker Schrenk, Herten (DE); Udo Spitzer, Haltern am See (DE); Hans-Dieter Zagefka, Haltern am See (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1249 days.

(21) Appl. No.: 12/516,152

(22) PCT Filed: Sep. 13, 2007

(86) PCT No.: PCT/EP2007/059614
§ 371 (c)(1),
(2), (4) Date: May 22, 2009

(87) PCT Pub. No.: WO2008/061826
PCT Pub. Date: May 29, 2008

(65) Prior Publication Data
US 2010/0050900 A1    Mar. 4, 2010

(30) Foreign Application Priority Data

Nov. 25, 2006   (DE) .......................... 10 2006 055 729

(51) Int. Cl.
| | | |
|---|---|---|
| C08F 4/52 | (2006.01) |
| C08F 110/02 | (2006.01) |
| C10L 1/16 | (2006.01) |
| C07C 2/02 | (2006.01) |
| C07C 2/04 | (2006.01) |
| C07C 2/24 | (2006.01) |
| C09D 5/03 | (2006.01) |
| C09D 7/12 | (2006.01) |
| C09J 123/08 | (2006.01) |
| C08L 23/04 | (2006.01) |
| C08L 23/06 | (2006.01) |

(52) U.S. Cl.
CPC .............. *C08F 110/02* (2013.01); *C09D 5/037* (2013.01); *C09D 7/125* (2013.01); *C09J 123/0853* (2013.01); *C08L 23/04* (2013.01); *C08L 23/06* (2013.01); *C08L 2314/02* (2013.01); *C08L 2314/04* (2013.01)

(58) Field of Classification Search
CPC ............ C08F 4/52; C08F 110/02; C10L 1/16; C07C 2/02; C07C 2/04; C07C 2/24
USPC ............... 585/510, 9, 502, 512; 526/185, 352
See application file for complete search history.

(56) References Cited

U.S. PATENT DOCUMENTS

| | | | |
|---|---|---|---|
| 3,892,717 A * | 7/1975 | Mori et al. ..................... 525/285 |
| 2005/0085601 A1 | 4/2005 | Vizzini et al. |
| 2007/0060669 A1 * | 3/2007 | Yoda et al. ..................... 523/160 |
| 2008/0125530 A1 | 5/2008 | Spitzer et al. |

FOREIGN PATENT DOCUMENTS

| | | | |
|---|---|---|---|
| DE | 1 520 914 | 1/1970 | |
| DE | 1 645 411 | 5/1970 | |
| DE | 42 35 404 | 4/1994 | |
| DE | 42 35 405 | 4/1994 | |
| GB | 1056175 A * | 1/1967 | .............. C08F 10/02 |
| GB | 1 329 334 | 9/1973 | |
| GB | 1056175 A * | 1/1975 | .............. C08F 10/02 |
| WO | WO 2005030889 A1 * | 4/2005 | .............. C09D 11/02 |

OTHER PUBLICATIONS

Baker Petrolite Corporation. Polywax Polyethylenes. 2002. pp. 1-4.*

* cited by examiner

*Primary Examiner* — Fred M Teskin
*Assistant Examiner* — Elizabeth Eng
(74) *Attorney, Agent, or Firm* — Ingrassia Fisher & Lorenz, P.C.

(57) ABSTRACT

A process for preparing a polyethylene wax by polymerization of ethylene in the presence of a Ziegler-Natta catalyst system composed of titanium tetrachloride and dialkylaluminium halide, wherein
  the polymerization temperature is in the range from 170 to 200° C.,
  the polymerization is carried out essentially in the absence of solvents and
  the Al/Ti molar ratio is less than 1.6,
gives a wax having the following property profile:
  dropping point of from 115 to 125° C.;
  penetration number of not more than $1\ mm \cdot 10^{-1}$;
  viscosity at 150° C. of less than 60 mPas;
  density of from 0.945 to 0.960 $g/cm^3$ at 23° C.;
  molar mass of less than 1500 g/mol and
  crystallinity of more than 70%.

18 Claims, No Drawings

PROCESS FOR PREPARING SYNTHETIC POLYETHYLENE WAXES HAVING A HIGH CRYSTALLINITY AND LOW VISCOSITY

The invention relates to a process for preparing highly crystalline synthetic waxes having a low viscosity from ethylene and the use of these waxes, for example in hot melts or printing inks.

Synthetic waxes can be prepared by, inter alia, Ziegler-Natta polymerization of ethylene. DE-A 15 20 914 describes a process for preparing waxes from ethylene by means of the Ziegler-Natta synthesis. In this process, the polymerization, generally in petroleum spirit as solvent, gives hard waxes at temperatures of from 150° C. to 170° C. and soft waxes at temperatures of from 170° C. to 190° C. The examples describe products prepared at polymerization temperatures of from 150° C. to 170° C. which are either relatively highly viscous and very hard (viscosities of above 100 mPas at 150° C. and penetration numbers of less than 1 mm·$10^{-1}$ at 23° C.) or have a low viscosity and are softer (about 50 mPas by 150° C. and more than 1 mm·$10^{-1}$ at 23° C.). The properties of these polyethylene waxes prepared according to the prior art are thus determined by the combination of viscosity and hardness. High hardnesses (less than 1 mm·$10^{-1}$) can only be achieved at relatively high viscosities (above 100 mPas). However, this combination of the properties has disadvantages in some applications:
- although corresponding micronized products display good abrasion protection, only small throughputs are obtained in the micronization;
- although such products effect an excellent improvement in the heat resistance in hot melts, the viscosity of the hot melts is reduced only insufficiently.

Fischer-Tropsch waxes, on the other hand, have both a relatively low viscosity (less than 20 mPas at 150° C.) and a high hardness (penetration numbers of less than 1 mm·$10^{-1}$) and are thus particularly suitable for micronization and for viscosity reduction in hot melts. However, the abrasion protection action is frequently unsatisfactory and the improvement in the heat resistance of hot melts is lower than in the case of the polyethylene waxes of DE-A 15 20 194.

It was an object of the present invention to develop a process for preparing polyethylene waxes in which the positive properties of relatively highly viscous, hard polyethylene waxes are combined with the positive properties of Fischer-Tropsch waxes.

This object is achieved by a process for preparing a polyethylene wax by polymerization of ethylene in the presence of a Ziegler-Natta catalyst system composed of titanium tetrachloride and dialkylaluminium halide, wherein
- the polymerization temperature is in the range from 170 to 200° C. and preferably in the range from 175 to 195° C.,
- the polymerization is carried out essentially in the absence of solvents and
- the Al/Ti molar ratio is less than 1.6 and preferably less than 1.5.

This process makes it possible to obtain products having the following property profile:
Dropping point in accordance with DIN 51801: from 115 to 125° C.
Penetration number in accordance with DIN 51579: not more than 1 mm·$10^{-1}$
Viscosity in accordance with DIN 52007/01: less than 60 mPas at 150° C., preferably less than 50 mPas at 150° C.
Density: from 0.945 to 0.960 g/cm$^3$ at 23° C., preferably from 0.950 to 0.960 g/cm$^3$
Molar mass (number average $M_n$ from high-temperature GPC in accordance with ASTM D 6474-99: less than 1500 g/mol, preferably less than 1400 g/mol
Crystallinity (DSC—analysis in accordance with ISO 11357-3): greater than 70%

The invention further provides the polyethylene waxes which can be prepared by this process and their use as additives for printing inks or surface coating compositions, constituents of hot melts, nucleating agents for expandable polystyrene or lubricants in PVC. In the dialkylaluminium halide, alkyl is preferably a group having from 1 to 4 carbon atoms, for example methyl, ethyl, n-propyl, n-butyl or isobutyl, while it is possible to use, for example, chloride or bromide as halide. Preference is given to diethylaluminium chloride.

The present invention likewise provides printing inks, surface coating compositions, powder coatings or hot melts containing polyethylene waxes according to the present invention. In the applications mentioned, the polyethylene waxes of the invention can be combined with all additives or auxiliaries which are customary for these applications and are known to those skilled in the art.

In the case of hot melts, the polyethylene waxes of the invention can, for example, be combined with polymers (e.g. polyolefins, amorphous poly-alpha-olefins, ethylene-vinyl acetate copolymers, synthetic rubber), resins (e.g. hydrocarbon resins and tall oil resins) and also waxes (e.g. Fischer-Tropsch waxes, fully refined paraffin waxes).

In addition to the polyethylene waxes according to the invention, printing inks, surface coating compositions and powder coatings can additionally contain colorants, for example inorganic pigments (e.g. carbon black, $TiO_2$), effect pigments or organic pigments (e.g. phthalocyanine, quinacridones). Further customary constituents are binders (e.g.: linseed oils, polyesters, phenolic resins, melamine resins, nitrocellulose, polyurethanes, epoxy resins, acrylates), solvents (e.g. hydrocarbons, alcohols, esters, water) and other additives (e.g. matting agents, antifoams, levelling agents).

Even without further explanations, it is assumed that a person skilled in the art can utilize the above description in its fullest scope. The preferred embodiments and examples are therefore to be interpreted merely as descriptive but not at all limiting disclosure.

The present invention is illustrated below with the aid of examples. Alternative embodiments of the present invention can be obtained in an analogous way.

General Method:

In a 20 m$^3$ reactor provided with a powerful circulation pump, ethylene was polymerized continuously in the melt (10 m$^3$ of polymer) with cooling by means of the catalyst indicated in Table 1. The gas composition at the beginning of the reaction determined by GC analysis was, depending on the product to be prepared, from 35 to 70% by volume of hydrogen, from 30 to 50% by volume of ethylene and nitrogen as balance. To remove the ethane formed during the polymerization, the gas was withdrawn from the reactor space and burnt in particular cycles.

To determine the crystallinity, the enthalpy of fusion was firstly determined by DSC analysis in accordance with ISO 11357-3 in the 2nd heating. The crystallinity was calculated therefrom according to the following formula:

$$\% \text{ crystallinity} = (\Delta H_f - \Delta H_x)/\Delta H°_f \times 100\%$$

where $\Delta H_f$: area under the DSC melting curve, which corresponds to the enthalpy of fusion of the polymer examined in J/g:
$\Delta H_x$: enthalpy of any crystallization of the polymer examined occurring during heating in J/g (in the present case, $\Delta H_x = 0$ J/g);
$\Delta H°_f$: material-specific value for the enthalpy of fusion of a 100% crystalline polymer, in the present case (polyethylene), $\Delta H°_f = 286$ J/g.

TABLE 1

Examples 1 and 2 and Comparative Examples 1 to 5

| | Example (E) or Comparative Example (CE) | | | | | | |
|---|---|---|---|---|---|---|---|
| | E1 | E2 | CE1 | CE2 | CE3 | CE4[1] | CE5[2] |
| Polymerization conditions: | | | | | | | |
| Temperature [° C.] | 185 | 190 | 185 | 190 | 195 | | |
| Reactor pressure [bar] | 16 | 17 | 15 | 16 | 15 | | |
| $TiCl_4$ addition rate [kg/h] | 1.6 | 1.7 | 1.4 | 1.3 | 1.2 | | |
| Diethylaluminium chloride addition rate [kg/h] | 1.4 | 1.4 | 1.6 | 1.5 | 1.6 | | |
| Molar ratio of Al/Ti | 1.4 | 1.3 | 1.8 | 1.8 | 2.1 | | |
| Hydrogen addition rate [$m^3$/h] | 4 | 4 | 3 | 4 | 3 | | |
| Product: | | | | | | | |
| Yield [kg/h] | 300 | 310 | 400 | 280 | 350 | | |
| Dropping point [° C.] | 120 | 118 | 124 | 118 | 122 | 111 | 124 |
| Penetration number at 23° C. [1 mm · $10^{-1}$] | <1 | 1 | <1 | 3 | 2 | 1 | <1 |
| Viscosity at 150° C. [mPas] | 45 | 42 | 124 | 45 | 75 | <20 | 110 |
| Density at 23° C. [g/$cm^3$] | 0.955 | 0.953 | 0.959 | 0.942 | 0.939 | 0.94 | 0.96 |
| Molar mass (HT-GPC): $M_n$ [g/mol] | 1200 | 1100 | 1600 | 1000 | 1400 | 650 | 1600 |
| $M_w$ [g/mol] | 4100 | 4300 | 5650 | 3900 | 5900 | 760 | 5600 |
| Polydispersity | 3.4 | 3.9 | 3.5 | 3.9 | 4.2 | 1.2 | 3.6 |
| Crystallinity (DSC) [%] | 78 | 75 | 75 | 57 | 62 | 80 | 75 |
| Colour | white | white | white | white | white | white | white |

[1] Comparative data for a commercial Fischer-Tropsch hard paraffin
[2] Comparative date for a commercial relative to highly crystalline polyethylene hard paraffin Use of the Wax Prepared According to the Invention as Per Example 1 and Also the Fischer-Tropsch Hard Paraffin which is not According to the Invention as Per Comparative Example 4 and the Polyethylene Hard Paraffin which is not According to the Invention as Per Comparative Example 5

A. For Printing Inks

The waxes were micronized at room temperature and a pressure of 7 bar in a commercial air jet mill; the result is shown in Table 2.

| Throughput in the micronization: | Wax from E1 | 160 kg/h |
|---|---|---|
| | Wax from CE4 | 160 kg/h |
| | Wax from CE5 | 120 kg/h |

TABLE 2

Particle size analysis (Malvern Mastersizer 2000)

| Particle size | Wax from E1 | Wax from CE4 | Wax from CE5 |
|---|---|---|---|
| D (0.5) | 6-7 μm | 5-6 μm | approx. 8 μm |
| D (0.99) | approx. 20 μm | approx. 16 μm | approx. 20 μm |

Abrasion protection tests were performed at an addition of 1% by weight of wax in a commercial toluene gravure printing ink and an offset printing ink using the Prüfbau Quartant abrasion tester; see Table 3.

TABLE 3

Abrasion protection test

| | Wax from E1 | Wax from CE4 | Wax from CE5 |
|---|---|---|---|
| Toluene gravure printing ink | 1200 strokes | 300 strokes | 1200 strokes |
| Offset printing ink | 1200 strokes | 200 strokes | 1200 strokes |

The wax according to the invention from Example 1 can be micronized at significantly higher throughputs under identical conditions than the wax as per Comparative Example 5 and gives the same abrasion protection as the wax as per Comparative Example 5 but a significantly greater abrasion protection compared to the wax as per Comparative Example 4.

B. For Hot Melts

Fischer-Tropsch waxes such as the wax as per Comparative Example 4 are used for regulating the melt viscosity (i.e. improving the processability) and the "open time" (setting behaviour) in hot melts (frequently in combination with fully refined paraffin waxes or microcrystalline waxes). In addition, they improve the water vapour barrier action, the surface smoothness and the appearance. However, in hot melts based on EVA, the heat resistance (SAFT, "shear adhesion failure temperature") is still capable of improvement. Relatively highly viscous, highly crystalline waxes such as the wax from Comparative Example 5 are used to improve the heat resistance, but the reduction in the viscosity and the surface smoothness is in this case frequently poorer than when using Fischer-Tropsch waxes. The waxes according to the invention enable both high heat resistances and also good surface smoothnesses and a reduction in the viscosity similar to those for Fischer-Tropsch waxes to be achieved.

Test Formulation:

1 part by mass of EVA polymer (MFR 43 g/10 min at 190° C./2.16 kg, VA content: 32% by weight)

1 part by mass of tall resin ester 0.7 part by mass of fully refined paraffin wax 52/54

0.3 part by mass of synthetic wax

TABLE 4

Results

| Synthetic wax in test formulation | Softening point [° C.] | Heat resistance (WPS 68) [° C.] | Surface smoothness | Processability |
|---|---|---|---|---|
| Wax from E1 | 113 | 70 | smooth | no problems |
| Wax from CE4 | 108 | 60-65 | smooth | no problems |

TABLE 4-continued

Results

| Synthetic wax in test formulation | Softening point [° C.] | Heat resistance (WPS 68) [° C.] | Surface smoothness | Processability |
|---|---|---|---|---|
| Wax from CE5 | 114 | 70 | slight surface defects | application somewhat problematical because of the relatively high viscosity |

C. Other Uses

The wax of the invention can also be used advantageously as lubricant in PVC, as nucleating agent for expandable polystyrene, as additive for surface coating compositions or powder coatings and as starting material for producing wax oxidate.

The invention claimed is:

1. A process for preparing a polyethylene wax, the wax having a penetration number in accordance with DIN 51579 of not more than 1 mm·$10^{-1}$, by polymerizing of ethylene in the presence of a Ziegler-Natta catalyst system composed of titanium tetrachloride and a dialkylaluminium halide, wherein
the polymerization temperature is in the range from 170 to 200° C.,
the polymerization is carried out essentially in the absence of solvents,
the dialkylaluminium halide is added to the process at a rate of 1.4 kg/hour,
and the Al/Ti molar ratio is less than 1.6.

2. The process according to claim 1, wherein the polymerization temperature is in the range from 175 to 195° C.

3. The process according to claim 1, wherein the Al/Ti molar ratio is less than 1.5.

4. A polyethylene wax prepared according to the process of claim 1 that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

5. The polyethylene wax according to claim 4 having a viscosity in accordance with DIN 52007/1 at 150° C. of less than 50 mPas.

6. The polyethylene wax according to claim 4, wherein the density is from 0.950 to 0.960 g/cm$^3$ at 23° C.

7. The polyethylene wax according to claim 4, wherein the molar mass is less than 1400 g/mol.

8. An additive used for printing inks, surface coating compositions, powder coatings or hot melts, the additive comprising a polyethylene wax that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

9. A nucleating agent for expandable polystyrene, a lubricant in PVC and a starting material for producing wax oxidate, all of which comprise a polyethylene wax that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

10. The process of claim 1, wherein the dialkylaluminium halide is diethylaluminium bromide.

11. The process of claim 1, wherein the dialkylaluminium halide is diethylaluminium chloride.

12. The polyethylene wax according to claim 4, having a viscosity in accordance with DIN 52007/1 at 150° C. of less than 45 mPas.

13. The polyethylene wax according to claim 4 having a throughput micronization of 160 kg/h.

14. A printing ink containing a polyethylene wax that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

15. The printing ink of claim 14, comprising 1% by weight of the polyethylene wax according to claim 4, and wherein the printing ink has an abrasion protection of 1200 strokes as determined using a Prüfbau Quartant abrasion tester.

16. A surface coating composition containing a polyethylene wax that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

17. A powder coating containing a polyethylene wax that has the following properties:

dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

18. A hot melt containing a polyethylene wax that has the following properties:
dropping point in accordance with DIN 51801 in the range from 115 to 125° C.;
penetration number in accordance with DIN 51579 of not more than 1 mm·$10^{-1}$;
viscosity in accordance with DIN 52007/1 at 150° C. of less than 60 mPas;
density of from 0.945 to 0.960 g/cm$^3$ at 23° C.;
molar mass in accordance with ASTM D 6474-99 of less than 1500 g/mol;
crystallinity in accordance with ISO 11357-3 of more than 70% and
a polydispersity of between 3.4 and 4.2.

* * * * *